US009066241B2

(12) United States Patent
Luo et al.

(10) Patent No.: US 9,066,241 B2
(45) Date of Patent: Jun. 23, 2015

(54) METHOD, DEVICE AND SYSTEM FOR COMMON CHANNEL PROCESSING

(71) Applicant: Huawei Technologies Co., Ltd., Shenzhen (CN)

(72) Inventors: Zezhou Luo, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 13/784,381

(22) Filed: Mar. 4, 2013

(65) Prior Publication Data

US 2013/0252627 A1    Sep. 26, 2013

Related U.S. Application Data

(63) Continuation of application No. PCT/CN2011/073769, filed on May 6, 2011.

(30) Foreign Application Priority Data

Sep. 3, 2010    (CN) .......................... 2010 1 0273696

(51) Int. Cl.
*H04W 72/00*    (2009.01)
*H04W 16/14*    (2009.01)
(Continued)

(52) U.S. Cl.
CPC .............. *H04W 16/14* (2013.01); *H04L 5/0032* (2013.01); *H04L 5/0078* (2013.01);
(Continued)

(58) Field of Classification Search
CPC ... H04W 72/04; H04W 16/14; H04W 72/082; H04W 76/02
USPC .................................. 455/450, 454; 370/329
See application file for complete search history.

(56) References Cited

U.S. PATENT DOCUMENTS 6,421,328 B1 *    7/2002    Larribeau et al. ............. 370/329
6,885,809 B1 *    4/2005    Asada ........................... 386/241
(Continued)

FOREIGN PATENT DOCUMENTS

CN        1829385 A        9/2006
CN        101137184 A      3/2008
(Continued)

OTHER PUBLICATIONS

Extended European Search Report issued in corresponding European Patent Application No. 11821022.8, mailed May 14, 2013.
(Continued)

*Primary Examiner* — Magdi Elhag
(74) *Attorney, Agent, or Firm* — Brinks Gilson & Lione

(57) ABSTRACT

The embodiments of the present invention provide a method, a device and a system for common channel processing, and the method includes: generating a first set of common channel spectrum candidates according to location information of available sub-carriers and attribute information of the available sub-carriers retrieved from a first database of spectrum statuses; transmitting the first set of the common channel spectrum candidates to a terminal; and determining candidate sub-channels for common channels from a third set of common channel spectrum candidates returned by the terminal, so as to generate and transmit a set of common channel spectrums to the terminal. With the embodiments of the present invention, the base station and the terminal acquire respectively local sub-carriers which are available currently, and perform spectrum negotiation. A set of common channel spectrums is determined by the base station, and a common channel mechanism is enabled in a dynamic spectrum environment.

26 Claims, 7 Drawing Sheets

(51) Int. Cl.
*H04L 5/00* (2006.01)
*H04L 27/00* (2006.01)
*H04W 72/12* (2009.01)
*H04W 28/18* (2009.01)

(52) U.S. Cl.
CPC ......... *H04L 5/0096* (2013.01); *H04L 27/0006* (2013.01); *H04W 72/1278* (2013.01); *H04W 28/18* (2013.01); *H04W 72/00* (2013.01)

(56) References Cited

U.S. PATENT DOCUMENTS

| | | | |
|---|---|---|---|
| 7,787,426 B2* | 8/2010 | Seidel et al. | 370/338 |
| 8,902,849 B2* | 12/2014 | Noh et al. | 370/330 |
| 2001/0050926 A1* | 12/2001 | Kumar | 370/529 |
| 2007/0248061 A1 | 10/2007 | Poston | |
| 2009/0074033 A1 | 3/2009 | Kattwinkel | |
| 2010/0157910 A1* | 6/2010 | Nentwig et al. | 370/329 |
| 2011/0144979 A1* | 6/2011 | Jung et al. | 704/200.1 |
| 2012/0071188 A1* | 3/2012 | Wang et al. | 455/509 |
| 2012/0238218 A1* | 9/2012 | Stine | 455/67.11 |
| 2013/0037728 A1* | 2/2013 | Kiesel et al. | 250/459.1 |

FOREIGN PATENT DOCUMENTS

| | | |
|---|---|---|
| CN | 101730147 A | 6/2010 |
| WO | WO 2008/143695 A2 | 11/2008 |

OTHER PUBLICATIONS

Ghosh et al., "Priority-based Spectrum Allocation for Cognitive Radio Networks Employing NC-OFDM Transmission" IEEE 2009.
Han et al., "Addressing the Control Channel Design Problem: OFDM-based Transform Domain Communication System in Cognitive Radio" Science Direct, Computer Networks, vol. 52, 2008.
Kim et al., "Distributed Coordination Protocol for Common Control Channel Selection in Multichannel Ad-hoc Cognitive Radio Networks" IEEE International Conference on Wireless and Mobile Computing, Network and Communications, 2009.
Written Opinion of the International Searching Authority issued in corresponding PCT Patent Application No. PCT/CN2011/073769, mailed Aug. 18, 2011.
International Search Report issued in corresponding PCT Patent Application No. PCT/CN2011/073769, mailed Aug. 18, 2011.
Han et al., "A Spectrum Exchange Mechanism in Cognitive Radio Contexts" 17 Annual Symposium on Personal, Indoor and Mobile Radio Communications (PIMRC'06) IEEE 2006.

* cited by examiner

| Base Station | Spectrum Detection | CCSK Transmission | CCSK Reception | CCSK Transmission | CCSK Reception | Spectrum Detection | CCSK Transmission | CCSK Reception | CCSK Transmission | CCSK Reception | ... |

| Terminal | CCSK Reception | Spectrum Detection | CCSK Reception | Spectrum Detection | ... |

Fig. 4

| Base Station | Spectrum Detection | CCSK Transmission | CCSK Reception | Communication |

| Terminal | Spectrum Detection | CCSK Reception | CCSK Transmission | Communication |

Fig. 5

METHOD, DEVICE AND SYSTEM FOR
COMMON CHANNEL PROCESSING

CROSS-REFERENCE TO RELATED APPLICATIONS

This application is a continuation of International Application No. PCT/CN2011/073769, filed on May 6, 2011, which claims priority to Chinese Patent Application No. 201010273696.7, filed on Sep. 3, 2010, both of which are hereby incorporated by reference in their entireties.

TECHNICAL FIELD

The embodiments of the present invention relate to the field of communication technology, and particularly, to a method, a device and a system for common channel processing.

BACKGROUND

A cellular wireless communication system adopts a cellular wireless networking mode, which connects terminals and network devices through wireless channels so that users can communicate with each other during movement. The cellular wireless communication system generally employs a common channel mechanism, which includes: achieving a spectrum synchronization and a time synchronization between a base station and a terminal during a power-on initializing stage through a pre-assigned common channel, so as to demodulate control data and service data; and after achieving the spectrum synchronization and the time synchronization, directly acquiring, by the terminal, important information related to system configuration, system management and link control from the pre-assigned common channel. Thus, the common channel is essential to the cellular wireless communication system.

In order to use the common channel mechanism in the prior art, the system is required to have fixed available spectrum as the carrier for the common channel. According to the existing fixed spectrum assignment mode, the spectrum of the common channel is fixed and known, and a common channel search and synchronization can be quickly and reliably performed between a base station and a terminal, and thus the availability and reliability of the common channel are ensured. However, the existing fixed spectrum assignment mode has a low efficiency and wastes spectrum resources. With the rapid increase of demands on mobile services, the utilization efficiency of the spectrum resources needs to be improved. The Dynamic Spectrum Access (DSA) technology employs an "opportunity type" access to the spectrum, which can solve the current problem of low utilization efficiency of the spectrum.

However, the DSA system adopts a dynamic spectrum assignment mode. The spectrum used by the system depends on current spectrum environment, and available spectrum is usually uncertain. Thus it is impossible to predetermine a fixed available spectrum as the carrier for the common channel in the fixed assignment mode. That is, the prior art does not provides a solution for using the common channel mechanism in the DSA system (i.e., the dynamic spectrum environment).

SUMMARY

The embodiments of the present invention provide a method, a device and a system for common channel processing, so as to use a common channel mechanism in a dynamic spectrum environment.

An embodiment of the present invention provides a method for common channel processing, including:

generating a first set of common channel spectrum candidates according to location information of available sub-carriers and attribute information of the available sub-carriers retrieved from a first database of spectrum statuses;

transmitting the first set of the common channel spectrum candidates to a terminal, so that the terminal determines a third set of common channel spectrum candidates according to the first set of the common channel spectrum candidates and a second set of common channel spectrum candidates generated by the terminal, wherein the third set of the common channel spectrum candidates is an intersection of the first set of the common channel spectrum candidates and the second set of the common channel spectrum candidates; and determining candidate sub-channels for common channels from the third set of the common channel spectrum candidates returned by the terminal, so as to generate and transmit a set of common channel spectrums to the terminal, wherein the set of the common channel spectrums comprises mapping relationship between the spectrums of the common channels and the candidate sub-channels for the common channels.

An embodiment of the present invention provides a method for common channel processing, including:

generating a second set of common channel spectrum candidates according to location information of available sub-carriers, and attribute information of the available sub-carriers retrieved from a second database of spectrum statuses;

determining a third set of common channel spectrum candidates, according to the second set of the common channel spectrum candidates and a first set of common channel spectrum candidates received from and generated by a base station, and transmitting the third set of the common channel spectrum candidate to the base station; wherein the third set of the common channel spectrum candidates is an intersection of the first set of the common channel spectrum candidates and the second set of the common channel spectrum candidates; and receiving a set of common channel spectrums returned by the base station, wherein the set of the common channel spectrums comprises mapping relationship between the spectrums of the common channels and candidate sub-channels determined for the common channels in the third set of the common channel spectrum candidates.

An embodiment of the present invention provides a base station, including:

a generation module configured to generate a first set of common channel spectrum candidates according to location information of available sub-carriers, and attribute information of the available sub-carriers retrieved from a first database of spectrum statuses;

a transmission module configured to transmit the first set of the common channel spectrum candidates to a terminal, so that the terminal determines a third set of common channel spectrum candidates according to the first set of the common channel spectrum candidates and a second set of common channel spectrum candidates generated by the terminal, wherein the third set of the common channel spectrum candidates is an intersection of the first set of the common channel spectrum candidates and the second set of the common channel spectrum candidates; and an acquisition module configured to determine candidate sub-channels for common channels from the third set of the common channel spectrum candidates returned by the terminal, and generate a set of common channel spectrums, wherein the set of the common channel spectrums comprises mapping relationship between the spectrums of the common channels and the candidate sub-channels for the common channel; and wherein the transmission module is further configured to transmit the set of the common channel spectrums generated by the acquisition module to the terminal.

An embodiment of the present invention provides a terminal, including:

a generation module configured to generate a second set of common channel spectrum candidates according to location information of available sub-carriers, and attribute information of the available sub-carriers retrieved from a second database of spectrum statuses;

a determination module configured to determine a third set of common channel spectrum candidates, according to the second set of the common channel spectrum candidates and a first set of common channel spectrum candidates received from and generated by a base station, wherein the third set of the common channel spectrum candidates is an intersection of the first set of the common channel spectrum candidates and the second set of the common channel spectrum candidates;

a transmission module configured to transmit the third set of the common channel spectrum candidates to the base station; and a reception module configured to receive a set of common channel spectrums returned by the base station, wherein the set of the common channel spectrums comprises mapping relationship between the spectrums of the common channels and the candidate sub-channels determined for the common channels in the third set of common channel spectrums.

An embodiment of the present invention provides a system for common channel processing, including a base station provided by the above embodiment of the present invention and a terminal provided by the above embodiment of the present invention.

According to the method, device and system for common channel processing provided by the embodiments of the present invention, a base station acquires local available sub-carriers to generate and transmit a first set of common channel spectrum candidates to a terminal. The terminal acquires local available sub-carriers to generate a second set of common channel spectrum candidates and transmits to the base station an intersection of the first set of the common channel spectrum candidates and the second set of the common channel spectrum candidates, i.e., a third set of common channel spectrum candidates, so that the base station selects candidate sub-channels for the common channels from the third set of the common channel spectrum candidates, i.e., generates a set of common channel spectrums. That is to say, the base station and the terminal acquire the currently available local sub-carriers, respectively, and perform a spectrum negotiation. Finally, the base station determines a set of common channel spectrums. Thus, a common channel mechanism is enabled in a dynamic spectrum environment.

BRIEF DESCRIPTION OF DRAWINGS

In order to more clearly describe the technical solutions of the embodiments of the present invention or the prior art, the drawings to be used in the descriptions of the embodiments or the prior art are briefly introduced as follows. Obviously, the following drawings just illustrate some embodiments of the present invention, and a person skilled in the art can conceive of other drawings from these drawings without paying a creative effort.

FIG. 4 illustrates diagrams of frame structures for a base station and a terminal when initialization is started or spectrum synchronization is not performed.

FIG. 5 illustrates diagrams of frame structures transmitted by a base station and a terminal when a common channel is maintained.

DESCRIPTION OF EMBODIMENTS

In order to make the object, technical solutions and advantages of the embodiments of the present invention be clearer, the technical solutions of the embodiments of the present invention will be clearly and completely described as follows with reference to the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

Figure 1:
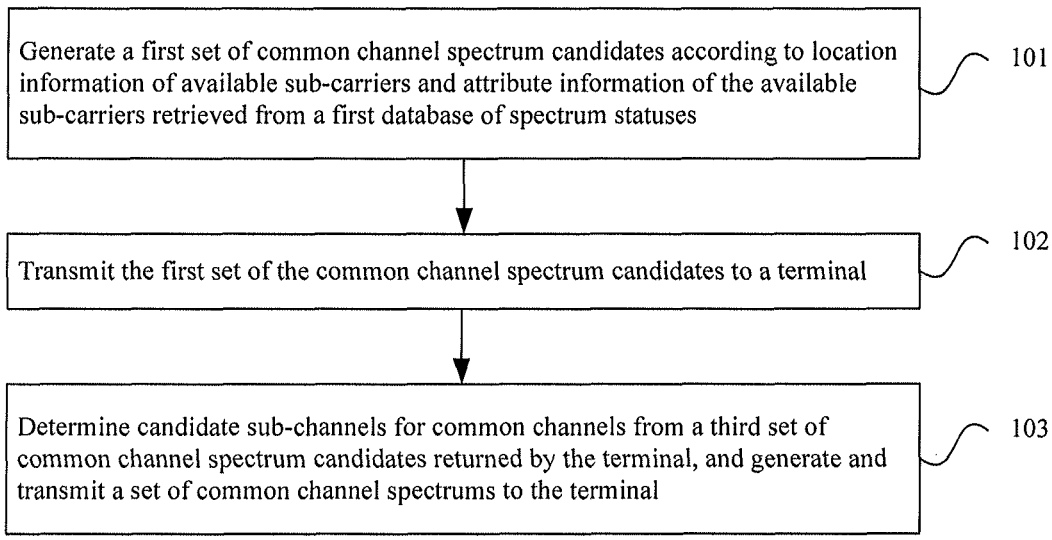
FIG. 1 is a flowchart illustrating Example 1 of a method for common channel processing of the present invention.

FIG. 1 is a flowchart illustrating Example 1 of a method for common channel processing according to the present invention, which may be applicable to a base station. The method is described hereinafter with reference to FIG. 1.

In step 101, a first set of common channel spectrum candidates is generated according to location information of available sub-carriers and attribute information of the available sub-carriers retrieved from a first database of spectrum statuses.

The embodiment may be applicable to a cellular wireless communication system, and also to any centralized wireless communication system having a central control point. Herein, the first database of spectrum statuses may be, but not limited to, a database integrated with a base station, or a database external to a base station capable of communicating with the external database. Herein, the attribute information of the sub-carriers is history information of usage statuses of the sub-carriers, and may include: average continuous available time, idle probability, capacity and other statistical information of the respective sub-carriers.

The first set of the common channel spectrum candidates may include location information of the candidate sub-channels.

The base station retrieves the location information of currently available local sub-carriers through spectrum detection. The first database of spectrum statuses includes attribute information of all the local sub-carriers of the base station.

When acquiring the location information of the currently available sub-carriers, the base station retrieves the attribute information of these available sub-carriers from the first database of spectrum statuses, and generates the first set of the common channel spectrum candidates according to the attribute information of these available sub-carriers.

In step 102, the first set of the common channel spectrum candidates is transmitted to a terminal, so that the terminal determines a third set of common channel spectrum candidates according to the first set of the common channel spectrum candidates and a second set of common channel spectrum candidates generated by the terminal.

The third set of the common channel spectrum candidates is an intersection of the first and second sets of the common channel spectrum candidates. In the embodiments of the present invention, each set of the common channel spectrum candidates includes location information of the candidate sub-channels.

Before transmitting the first set of the common channel spectrum candidates to the terminal, the base station may encode the first set of the common channel spectrum candidates, so as to reduce the number of bits required to transmit the first set of the common channel spectrum candidates. Herein, the base station may transmit the first set of the common channel spectrum candidates to the terminal in a Cyclic Code Shift Keying sequence modulation mode or other existing modes.

The terminal may retrieve location information of the local available sub-carriers through spectrum detection. The terminal may be preset with a second database of spectrum statuses which includes attribute information of all the local available sub-carriers. When acquiring the location information of the currently available sub-carriers, the terminal retrieves the attribute information of the available sub-carriers from the preset or dynamically acquired second database of spectrum statuses, and generates the second set of the common channel spectrum candidates according to the attribute information of the available sub-carriers.

Upon receiving the first set of the common channel spectrum candidates transmitted by the base station, the terminal takes an intersection of the first and second sets of the common channel spectrum candidates to obtain the third set of the common channel spectrum candidates. Next, the terminal transmits the third set of the common channel spectrum candidates to the base station.

In step 103, candidate sub-channels for the common channel are determined from the third set of the common channel spectrum candidates returned by the terminal, and then a set of common channel spectrums is generated and transmitted to the terminal.

The set of the common channel spectrums includes mapping relationship between the spectrums of the common channel and the candidate sub-channels for the common channel. Each candidate sub-channel has corresponding spectrum information. After the candidate sub-channels for the common channel are determined from the third set of the common channel spectrum candidates, the spectrums of the candidate sub-channels are determined as those of the common channel.

The base station acquires a currently available set of common channel spectrums according to the third set of the common channel spectrum candidates returned by one or more terminals, and transmits the set of the common channel spectrums to the terminal, so as to communicate with the terminal via the set of the common channel spectrums. Particularly, the base station may transmit the set of the common channel spectrums to the terminal in the Cyclic Code Shift Keying sequence modulation mode.

According to the embodiment of the present invention, the base station acquires the local available sub-carriers to generate the first set of the common channel spectrum candidates, performs a spectrum negotiation with the second set of the common channel spectrum candidates generated by the terminal, and finally determines the set of the common channel spectrums from the available sub-carriers shared by the base station and the terminal, so a common channel mechanism is enable in a dynamic spectrum environment. Therefore, the embodiment of the present invention enables a legacy system to operate in a fixedly assigned or non-fixedly (i.e., dynamically) assigned spectrum environment to implement backward compatibility of spectrum synchronization. Meanwhile, a dynamic spectrum sharing can be achieved between different systems due to the opportunity type access to the spectrums.

Figure 2:
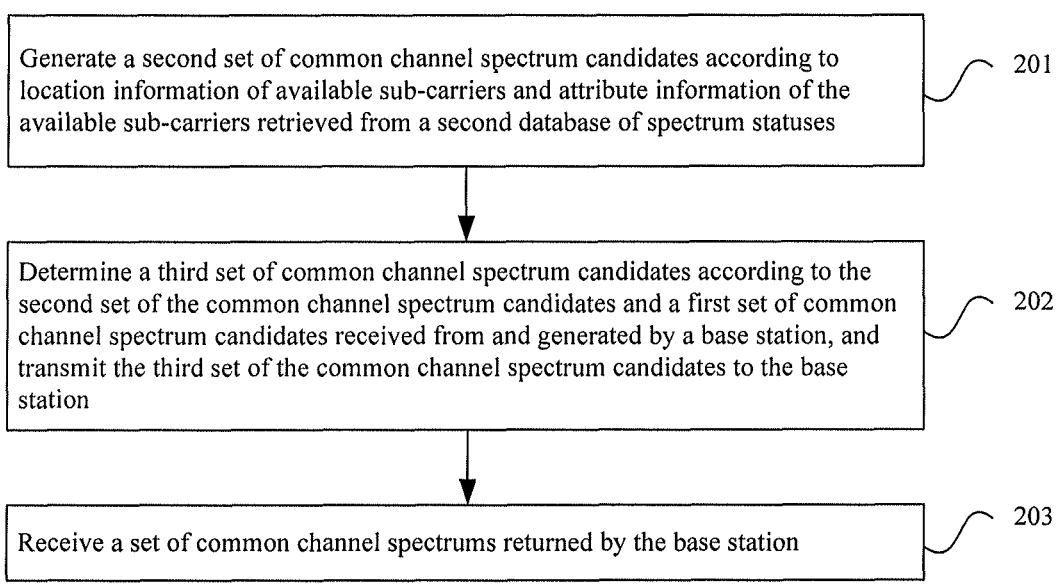
FIG. 2 is a flowchart illustrating Example 2 of a method for common channel processing of the present invention.

FIG. 2 is a flowchart illustrating Example 2 of a method for common channel processing according to the present invention, which may be applicable to a terminal. The method is hereinafter described with reference to FIG. 2.

In step 201, a second set of common channel spectrum candidates is generated according to location information of available sub-carriers and attribute information of the available sub-carriers retrieved from a second database of spectrum statuses.

The second set of the common channel spectrum candidates may include location information of the candidate sub-channels.

The embodiment may be applicable to a cellular wireless communication system, and also to any centralized wireless communication system having a central control point. Herein, the second database of spectrum statuses may be, but not limited to, a database integrated with a terminal, or a database external to a terminal capable of communicating with the external database. Herein, the attribute information of the sub-carriers is history information of usage statuses of the sub-carriers, and may include: average continuous available time, idle probability, capacity and other statistical information of the respective sub-carriers.

The terminal retrieves the location information of the currently available local sub-carriers through spectrum detection. The second database of spectrum statuses includes the attribute information of all the local available sub-carriers of the terminal. When acquiring the location information of the currently available sub-carriers, the terminal retrieves the attribute information of the available sub-carriers from the second database of spectrum statuses, and generates the second set of the common channel spectrum candidates according to the attribute information of the available sub-carriers.

In step 202, a third set of common channel spectrum candidates is determined according to the second set of the common channel spectrum candidates and a first set of common channel spectrum candidates received from and generated by a base station, and is transmitted to the base station.

The third set of the common channel spectrum candidates is an intersection of the first and second sets of the common channel spectrum candidates. In the embodiments of the present invention, each set of the common channel spectrum candidates includes the location information of the candidate sub-channels.

The base station transmits the first set of the common channel spectrum candidates generated by itself to the terminal in a Cyclic Code Shift Keying sequence modulation mode, for example. The terminal takes an intersection of the second set of the common channel spectrum candidates generated by itself and the first set of the common channel spectrum candidates to acquire the third set of the common channel spectrum candidates. Next, the terminal transmits the third set of the common channel spectrum candidates to the base station, so that the base station determines a currently available set of common channel spectrums according to the third set of the common channel spectrum candidates.

In step 203, the set of the common channel spectrums returned by the base station is received. The set of the common channel spectrums includes mapping relationship between the spectrums of the common channel and the candidate sub-channels determined for the common channel in the third set of the common channel spectrum candidates.

The base station determines the candidate sub-channels currently available for the common channel from the third set of the common channel spectrum candidates to generate the set of the common channel spectrums, and transmits the set of the common channel spectrums to the terminal. Upon receiving the set of the common channel spectrums, the terminal communicates with the base station through the common channels in the set of the common channel spectrums.

According to the embodiment of the present invention, the terminal acquires local available sub-carriers to generate the second set of the common channel spectrum candidates, determines the third set of the common channel spectrum candidates according to the second set of the common channel spectrum candidates and the first set of the common channel spectrum candidates received from and generated by the base station, and transmits the third set of the common channel spectrum candidates to the base station. The terminal receives the set of the common channel spectrums returned by the base station, which includes the mapping relationship between the spectrums of the common channel and the candidate sub-channels determined for the common channel in the third set of the common channel spectrum candidates. In other words, the base station and the terminal acquire the currently available local sub-carriers, respectively, and perform a spectrum negotiation, and finally, the base station determines the set of the common channel spectrums from the available sub-carriers shared by the base station and the terminal, so that a common channel mechanism is enabled in a dynamic spectrum environment.

Figure 3:
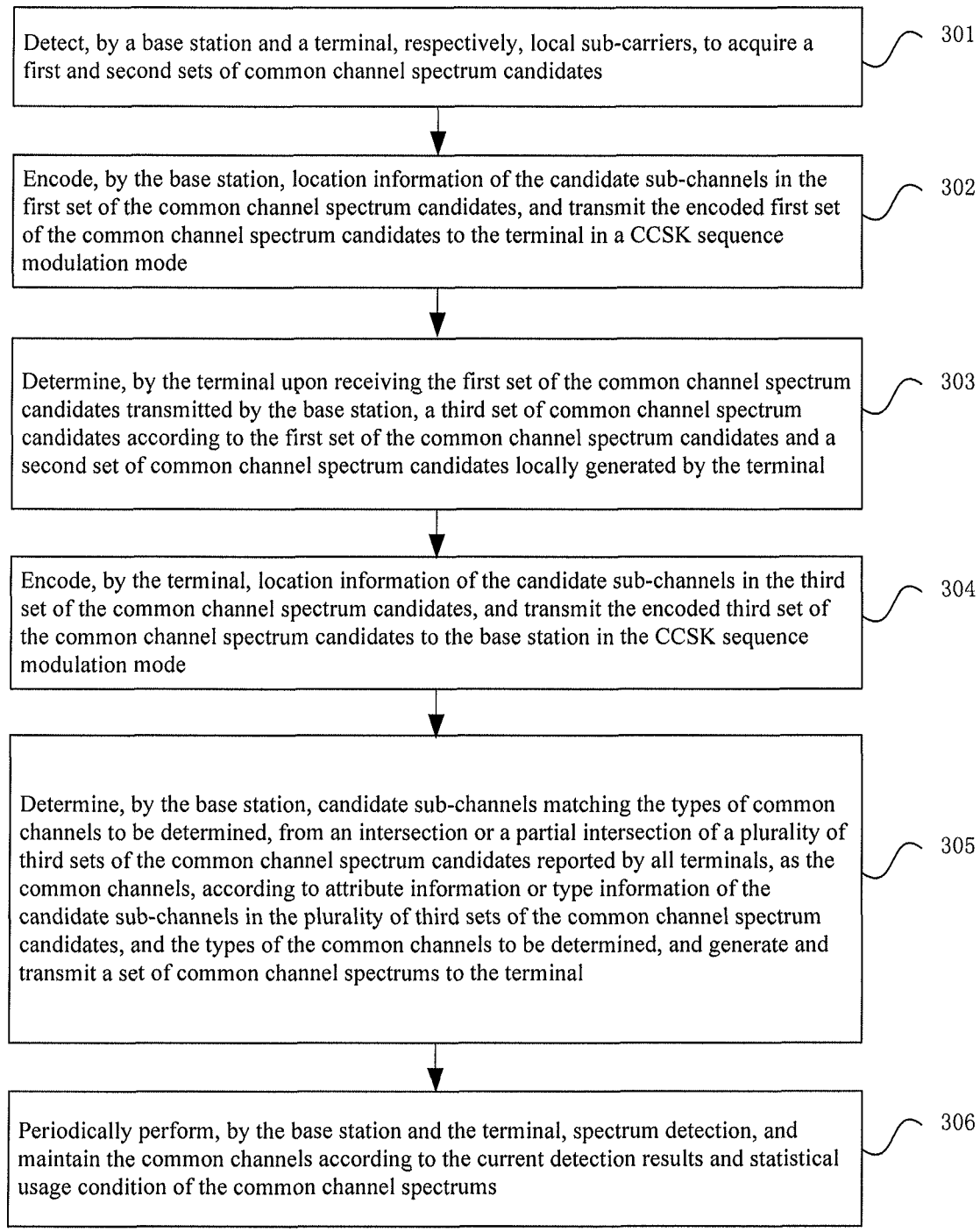
FIG. 3 is a flowchart illustrating Example 3 of a method for common channel processing of the present invention.

FIG. 3 is a flowchart illustrating Example 3 of a method for common channel processing according to the present invention. The method is hereinafter described with reference to FIG. 3.

In step 301, a base station and a terminal detect local sub-carriers, respectively, to acquire a first and a second set of common channel spectrum candidates.

During an initialization stage of a system, a base station and a terminal acquire a set of locations of local available sub-carriers $F_{loc\_1}$ through spectrum detection. Herein, a method for acquiring the available sub-carriers may include: the base station or the terminal measures signal power on each sub-carrier, and when the signal power on a certain sub-carrier exceeds a predetermined power threshold, the sub-carrier is determined as being occupied by other systems and then unavailable, otherwise the sub-carrier is determined as an available sub-carrier. The base station may also acquire the local available sub-carriers in a spectrum detection method such as matched filtering and feature cyclic detection.

In addition, during the spectrum detection, the base station or the terminal may determine locations of sub-carriers to be detected depending on spectrum usage statistical information and reasoning mechanism, so as to improve efficiency and speed of the spectrum detection.

In the system, each node (i.e., each base station and each terminal) may contain its database of spectrum statuses, which includes attribute information of all local sub-carriers, wherein the attribute information of the sub-carriers is history information of usage statuses of all the sub-carriers, and may include average continuous available time, idle probability, capacity and other statistical information of the respective sub-carriers. Herein, the database of spectrum statuses of each node may be dynamically acquired by the node rather than being contained in the node.

After acquiring the location information of the local available sub-carriers, the base station or the terminal inquires the attribute information corresponding to the available sub-carriers from the local database of spectrum statuses, and generates location information of available sub-channels serving as candidate common channels and type information of common channels corresponding to the available sub-channels according to the location information and the attribute information of the available sub-carriers, or generates location information of available sub-channels serving as candidate common channels and attribute information of the available sub-channels. For example, the base station or terminal may sort the sub-carriers in set $F_{loc\_1}$ according to the average continuous available time, and select the sub-carriers having long average continuous available time as candidate spectrums for common channels. The base station or terminal may also select continuous sub-carriers so far as possible to form a sub-channel according to the radio frequency front-end capability of the system with respect to common channels. The base station or terminal may also select a sub-carrier combination according to a capacity requirement. Thus the base station or terminal can generate a local set of common channel spectrum candidates $F_{loc\_cc}$, which includes all the candidate spectrum information for the common channels and type information of the common channels (or attribute information of the sub-channels corresponding to the spectrum information). That is to say, the first or second set of the common channel spectrum candidates may include the location information and the attribution information of the candidate sub-channels, or the location information and the type information of the candidate sub-channels.

In step 302, the base station encodes the location information of the candidate sub-channels in the first set of the common channel spectrum candidates, and transmits the encoded first set of the common channel spectrum candidates to the terminal in a CCSK sequence modulation mode.

In case that spectrum synchronization is not available between the base station and the terminal, they may perform a spectrum negotiation for common channels in the Cyclic Code Shift Keying (CCSK) sequence modulation mode.

The process for the base station to transmit the acquired first set of the common channel spectrum candidates to the terminal in the CCSK sequence modulation mode may be as follows: the base station maps the local set of the common channel spectrum candidates $F_{loc\_cc}$ and the base station identification (ID) into cyclic offsets of a specific CCSK sequence; a CCSK sequence modulation module generates a cyclic shift sequence for the CCSK sequence according to the offsets, thereby forming a spectrum negotiation message for common channels. The length of the CCSK sequence is equal to the number of the sub-carriers, i.e., each chip of the sequence correspondingly modulates one sub-carrier. In order not to interfere with other systems being used, a chip corresponding to an unavailable sub-carrier is set as zero. In accordance with the characteristics of the CCSK sequence modulation, a CCSK sequence having a length of N may carry information of $\log_2$ (N) bits. In specific transmitting time slots, the base station periodically transmits the set of the common channel spectrum candidates $F_{loc\_cc}$ and the base station ID through the CCSK sequence modulation. In accordance with the characteristics of the CCSK sequence modulation, even if the terminal only receives part of the CCSK sequence (corresponding to the available sub-carriers), it still can reliably recognize the cyclic offsets of the CCSK sequence, thereby acquiring the set of the common channel spectrum candidates $F_{loc\_cc}$ transmitted by the base station.

Since the CCSK sequence having a length of N can carry the information of $\log_2$ (N) bits, the location information of the candidate sub-channels in the first set of the common channel spectrum candidates may be encoded to represent the locations of the sub-channels with a small number of bits, so as to carry the information of the set of the common channel spectrums as much as possible in the CCSK sequence. Specifically, the following methods are available for encoding the location information of the candidate sub-channels in the first set of the common channel spectrum candidates:

Method 1: if the system divides a working frequency band into fixed sub-channels, the location information of the candidate sub-channels is encoded by being represented with the sequence numbers of the sub-channels of the fixed working frequency band. In the method, when there are M1 candidate sub-channels, it means that the sequence number of each candidate sub-channel requires $\log_2$ (M1) bits, and K candidate sub-channels require $K \times \log_2$ (M1) bits.

Method 2: the location information of the candidate sub-channels is encoded by being represented with locations of the first and the last sub-carriers, or with the first sub-carrier and the number of consecutive sub-carriers. In case that the location information of the candidate sub-channels is represented with the locations of the first and the last sub-carriers, if the total number of the sub-carriers is M2, it means that the location of each sub-carrier requires $\log_2$ (M2) bits, the location of one sub-channel requires $2 \times \log_2$ (M2) bits, and the locations of K sub-channels require $2K \times \log_2$ (M2) bits. In case that the location information of the candidate sub-channels is represented with the first sub-carrier and the number of consecutive sub-carriers, if the total number of the sub-carriers is M2, it means that the location of each sub-carrier requires $\log_2$ (M2) bits, and the location of a sub-channel containing L continuous sub-carriers requires $\log_2$ ($L \times M2$) bits.

Herein, since each CCSK sequence only represents the sequence number of one sub-carrier, a plurality of CCSK sequences may be employed, or different cyclic shift sequences of the same CCSK sequence may be transmitted for multiple times, so as to represent the location of a sub-channel. When a plurality of CCSK sequences are used for synchronous transmissions, the CCSK sequences shall be orthogonal to each other.

Method 3: the location information of the candidate sub-channels is encoded by being represented with a spectrum mask. Herein, the location information of a sub-channel is represented with a mask vector composed of 0 and 1 . The length of the mask vector is equal to the total number of the sub-carriers in the sub-channel, and the elements in the mask vector are orderly corresponding to availabilities of the sub-carriers. The element at corresponding location is 1 when a certain sub-carrier is available, otherwise it is 0 . Of course, element 1 may be used to indicate that a sub-carrier is unavailable, while element 0 may be used to indicate that a sub-carrier is available. Generally, available and unavailable sub-carriers are continuously distributed, i.e., the elements of the mask vector usually include multiple continuous 0 and 1 . Next, the mask vector is compressed in an existing information source compression method, i.e., the mask vector may be represented with a small number of bits, so that the location information of the candidate channel is represented with a small number of bits.

To be noted, in case that the first set of the common channel spectrum candidates includes the type information of the sub-channels, the location information and the type information or only the location information of the candidate sub-channels may be included in the spectrum negotiation message for the common channels, when the set of the common channel spectrum candidates is transmitted through the CCSK sequence. Herein, when the spectrum negotiation message for the common channels only includes the location information of the candidate sub-channels, those candidate sub-channels are arranged in the spectrum negotiation message for the common channels in a predetermined order. That is to say, the transmitting and receiving parties appoint in advance the types corresponding to sub-channels orderly arranged in the spectrum negotiation message for the common channels. For example, in the spectrum negotiation message for the common channels, the type of the first sub-channel is a synchronization channel, the type of the second sub-channel is a random access channel, and the type of the third sub-channel is a broadcast channel, and so on. Next, the transmitting party adds the location information of corresponding sub-channels into the spectrum negotiation message for the common channels in the predetermined order. Under this circumstance, the number of bits required for spectrum information transmission between the transmitting and receiving parties can be further reduced.

For example, when the location information of the candidate sub-channels is represented with the locations of the first and the last sub-carriers, and the transmitting and receiving parties appoint in advance the types of the sub-channels orderly arranged in the spectrum negotiation message for the common channels, the data structure of the spectrum negotiation message for the common channels for example may be:

```
MSG_FREQ_LOC :=
{
   CH_LOC    Item_1; // location information of sub-channel 1
   ...
   CH_LOC    Item_n; // location information of sub-channel n
   ID        device_id; // base station identification
}.
```

In case that the location information of the candidate sub-channels is represented with the locations of the first and the last sub-carriers, while the transmitting and receiving parties do not appoint in advance the types of the sub-channels orderly arranged in the spectrum negotiation message for the common channels, the data structure of the spectrum negotiation message for the common channels for example may be:

```
MSG_FREQ_LOC :=
{
   CH_LOC    Item_1; // location information of sub-channel 1
   CH_TYPE   type_1;// channel type of sub-channel 1
   ...
   CH_LOC    Item_n; // location information of sub-channel n
   CH_TYPE   type_n;// channel type of sub-channel n
   IDdevice_id;      // base station identification
}.
```

In step 303, upon receiving the first set of the common channel spectrum candidates transmitted by the base station, the terminal determines a third set of common channel spectrum candidates according to the first set of the common channel spectrum candidates, and a second set of common channel spectrum candidates locally generated by the terminal.

The terminal monitors the CCSK sequence modulation signal of the base station on each sub-carrier, performs a Fast Fourier Transform (FFT) on the CCSK sequence modulation signal and matches it with a reference CCSK sequence to acquire cyclic offsets, and finally maps the cyclic offsets into the first set of the common channel spectrum candidates and the base station ID transmitted by the base station. Meanwhile, the terminal achieves time slot synchronization and frame synchronization by means of the matching peak of the CCSK sequence modulation signal. The time synchronization (including time slot synchronization and frame synchronization) between the base station and the terminal may also be performed with the aid of an external system such as GPS.

According to the demodulated base station ID, the terminal judges whether an access is required. If yes, the terminal selects an intersection of the sets of the common channel spectrum candidates at the base station side and the local side. The intersection is the third set of the common channel spectrum candidates.

In step 304, the terminal encodes location information of candidate sub-channels in the third set of the common channel spectrum candidates, and transmits the encoded third set of the common channel spectrum candidates to the base station in the CCSK sequence modulation mode.

The terminal feeds back the third set of the common channel spectrum candidates and the terminal ID to the base station. In case that the spectrums are not synchronized, the terminal may also feed back information to the base station using a CCSK sequence. Specifically, the following methods are available for the terminal to encode the location information of the candidate sub-channels in the third set of the common channel spectrum candidates. Method 1: if the system divides a working frequency band into fixed sub-channels, the location information of the candidate sub-channels is encoded by being represented with the sequence numbers of the sub-channels of fixed working frequency bands. Method 2: the location information of the candidate sub-channels is encoded by being represented with the locations of the first and the last sub-carriers, or with the first sub-carrier and the number of consecutive sub-carriers. Method 3: the location information of the candidate sub-channels is encoded by being represented with a spectrum mask. The process for the terminal to transmit information to the base station in the CCSK sequence modulation mode is the same as the process for the base station to transmit information to the terminal in the CCSK sequence modulation mode, and herein is omitted, please see step 302 for the detailed flows.

In step 305, the base station determines candidate sub-channels matching types of common channels to be determined as the common channels, from an intersection or a partial intersection of a plurality of third sets of the common channel spectrum candidates, according to the attribute information or type information of the candidate sub-channels in the plurality of third sets of the common channel spectrum candidates reported by all the terminals, and the types of the common channels to be determined, and then generates and transmits a set of common channel spectrums to the terminal. Herein, the third set of the common channel spectrum candidates includes not only the location information of the candidate sub-channels, but also the attribute information or type information thereof.

During the initialization stage of the system, the base station collects the feedback information of several terminals, and acquires a set of common channel spectrums according to the feedback information and the types of the common channels to be determined. The process may include:

if the plurality of third sets of the common channel spectrum candidates fed back by all the terminals have a common intersection, and the sub-channels in the intersection are matched with the types of the common channels to be determined, the sub-channels in the intersection matched with the types of the common channels to be determined are selected as the common channels, i.e., the spectrums of the sub-channels are used to carry the common channels, so as to acquire the set of the common channel spectrums;

if the plurality of third sets of the common channel spectrum candidates fed back by all the terminals have no sub-channel which is available to any terminal, the base station may map the common channels into different sub-channels each serving as a common channel between the base station and a part of terminals, so as to acquire the set of the common channel spectrums. That is to say, from the third sets of the common channel spectrum candidates fed back by one part of terminals and having a common intersection, the base station selects sub-channels matching types of common channels to be determined, as a common channel between the base station and the one part of the terminals; in addition, from the third sets of the common channel spectrum candidates fed back by another part of terminals and having a common intersection, the base station selects sub-channels matching types of common channels to be determined, as a common channel between the base station and the another part of the terminals;

if the plurality of third sets of the common channel spectrum candidates fed back by all the terminals have no sub-channel which is available to any terminal, the base station may also give up serving a part of terminals, and select sub-channels available to the remaining terminals and matching types of common channels to be determined, as the spectrums carrying the common channels, so as to acquire the set of the common channel spectrums.

In the above process, two methods are available for determining the candidate sub-channels matching types of common channels to be determined, from an intersection or a partial intersection of the plurality of third sets of the common channel spectrum candidates:

Method 1: the third set of the common channel spectrum candidates includes the location information and the attribute information of the candidate sub-channels; according to the types of the common channels to be determined, the base station selects the candidate sub-channels matching the attribute required by the types of the common channels from an intersection or a part of the intersection of the plurality of third sets of the common channel spectrum candidates.

Method 2: the third set of the common channel spectrum candidates includes the location information and the type information of the candidate sub-channels; according to the types of the common channels to be determined, the base station selects the candidate sub-channels matching the types of the common channels from an intersection or a part of the intersection of the plurality of third sets of the common channel spectrum candidates.

Herein, the number of the sub-channels occupied by the common channels may be determined depending on the types of the common channels. The types of the common channels may be determined depending on the functions of the common channels, and the common channels with different functions also have different types. In addition, different types of common channels each have a specific requirement on attribute of the employed sub-channels. For example, a common channel in the type of synchronization channel has a low requirement on channel capacity while requiring a long continuous available time; a common channel in the type of random access channel has a high requirement on channel capacity while a low requirement of continuous available time; and a common channel in the type of broadcast channel has a high requirement on both channel capacity and continuous available time.

Herein, in a downlink channel, the locations of the synchronization channel and the broadcast channel must be specified at the initialization stage, and the locations of other common channels may be specified either at the initialization stage or through subsequent broadcast messages. In an uplink channel, the random access channel must be specified at the initialization stage, and the locations of other common channels may be specified either at the initialization stage or through subsequent broadcast messages.

Moreover, in order to quickly carry out a spectrum handoff for the common channels when the original spectrums of the common channels are unavailable, the base station may provide a plurality of spare spectrums for each common channel. When establishing the spare spectrums, step 305 may be as follows (not shown in the drawing): the base station selects candidate sub-channels matching types of common channels to be determined, from an intersection or a part of the intersection of a plurality of third sets of the common channel spectrum candidates, according to the attribute information or type information of the candidate sub-channels in the plurality of third sets of the common channel spectrum candidates reported by all the terminals, and the types of the common channels to be determined, generates a primary set of common channel spectrums and at least one spare set of common channel spectrums according to the selected candidate sub-channels, and transmits the primary and spare sets of the common channel spectrums to the terminal. The spare set of the common channel spectrums includes mapping relationship between the spectrums of the common channels and the spare candidate sub-channels for the common channels.

The base station may select a plurality of candidate sub-channels matching the types of the common channels to be determined, from the intersection or a part of the intersection of the plurality of third sets of the common channel spectrum candidates, then generates a plurality of sets of common channel spectrums based on the selected candidate sub-channels, and selects one of the plurality of sets of the common channel spectrums as the primary set of the common channel spectrums while taking others as the spare sets of the common channel spectrums. Herein, the base station may select the primary set of the common channel spectrums according to attribute information of the candidate sub-channels. For example, the base station may select a set of common channel spectrums in which the sub-channels have a large capacity or long continuous available time as the primary set of the common channel spectrums, or randomly select a set of common channel spectrums as the primary set of the common channel spectrums. When the current common channel spectrums are unavailable, the base station and the terminal may directly skip to the spare channels provided by corresponding spare spectrums to reduce the interruption delay. The spare spectrums may also be used to provide an information transmission (e.g., the transmission of the first, second or third set of the common channel spectrum candidates and the set of the common channel spectrums in the embodiment) for spectrum resynchronization. When the current common channel spectrums are unavailable and the spare spectrums are insufficient to provide a common channel (e.g., the spare spectrums cannot meet the requirements of channel quality, continuous available time, etc.), the base station and the terminal may perform a negotiation of spectrum resynchronization through the spare spectrums to reduce the delay of spectrum resynchronization.

The base station forms a common channel configuration message according to the finally determined spectrum location of each common channel and the spare channel list, then encodes the common channel configuration message and maps it into a cyclic shift sequence of a dedicated CCSK sequence, and broadcasts the cyclic shift sequence in a specific transmitting time slot.

When the initialization stage is started or the terminal is ready to join a new cell, the terminal firstly monitors, in a specific time slot, the common channel configuration message periodically broadcasted by the base station through the CCSK sequence modulation signal. In case that the common channel configuration message is correctly demodulated and the common channel configuration is locally available at the terminal, the local spectrums of the common channels are configured. In case that the common channel configuration is not locally available at the terminal, the terminal enters a confined status and may not normally use the network, until the spectrums in the common channel configuration is available.

When the initialization stage is started or the terminal is ready to join a new cell, the terminal also monitors a common channel spectrum negotiation message transmitted by the base station through the CCSK sequence modulation signal. In case that the common channel spectrum negotiation message is correctly demodulated, a frame synchronization is obtained simultaneously. Next, spectrum detection is performed in a specific time slot, and the detection result is fed back to the base station in a specific time slot to complete spectrum synchronization between the uplink and downlink. In case that the CCSK sequence modulation signal is not correctly demodulated, the process selects that the communication is failed after a preset time expires, or repeats the spectrum synchronization.

When the initialization is started or the spectrums are not synchronized, the frame structures of the base station and the terminal are illustrated in FIG. 4. FIG. 4 illustrates the frame structure diagrams of the base station and the terminal when the initialization is started or the spectrums are not synchronized. In FIG. 4, in a spectrum detection time slot, a CCSK transmitting time slot, and a CCSK receiving time slot of the base station, the base station performs a spectrum detection, a CCSK transmission and a CCSK reception, respectively. In a spectrum detection time slot and a CCSK receiving time slot of the terminal, the terminal performs a spectrum detection and a CCSK reception, respectively. As can be seen from the frame structures in FIG. 4, when the initialization is started or the spectrums are not synchronized, the spectrum detection time slot of the terminal may correspond to the CCSK receiving time slot and the CCSK transmitting time slot of the base station. That is to say, when the terminal performs spectrum detection, it may receive a signal transmitted from the base station, and thus the result of the spectrum detection will be influenced. But the influence is periodic, and can be conveniently recognized and eliminated.

In step 306, the base station and the terminal periodically perform the spectrum detection, and maintain the common channels according to the current detection result and the statistical usage condition of the common channel spectrums.

Since the locations of the available spectrums vary with the spectrum environment, the common channels shall be maintained after the initialization.

The base station and the terminal periodically update the respective local databases of spectrum statuses, at least including updating the average continuous available time, the idle probability, and other statistical information of each sub-carrier.

Moreover, the base station and the terminal periodically perform steps 301 to 305. Herein, the base station periodically broadcasts the location information of the common channels in a specific time slot under the CCSK sequence modulation mode, including the base station ID and the location information of the synchronization channel, the broadcast channel and the uplink random access channel, and periodically receives the spectrum detection result fed back by the terminal in the CCSK sequence modulation mode.

When the uplink random access channel and the broadcast channel are available, the base station may receive, through the uplink random access channel, the spectrum detection result fed back by the terminal and the statistical information of the usage statuses of the common channel spectrums, and broadcast the channel configuration message and the spare channel list in the broadcast channel and the spare configuration channel. The terminal configures the local common channels according to the latest channel configuration content, and feeds back the local detection result and the statistical usage information of the common channel spectrums.

When common channels are maintained, the frame structures transmitted by the base station and the terminal are illustrated in FIG. 5. FIG. 5 illustrates diagrams of frame structures transmitted by a base station and a terminal when common channels are maintained. As can be seen from FIG. 5, the spectrums of the base station and the terminal are synchronized with each other.

The base station and the terminal not only exchange the current spectrum detection information through the common channels, but also perform information exchange in a specific CCSK feedback time slot. The base station judges whether the spectrums currently used by the synchronization channel, the downlink broadcast channel and the uplink random access channel are available in a CCSK feedback time slot. In case that the current spectrum of the synchronization channel is unavailable, the base station switches the synchronization channel to a new spectrum according to the local spectrum detection and the spectrum detection result returned by each terminal, and broadcasts the new spectrum location of the synchronization channel through the downlink broadcast channel. In case that the current spectrum of the broadcast channel is unavailable, the base station switches the broadcast channel to a new spectrum according to the local spectrum detection and the spectrum detection result returned by each terminal, and broadcasts the new spectrum location of the broadcast channel through a downlink CCSK time slot. In case that the current spectrum of the uplink random access channel is unavailable, the base station switches the uplink random access channel to a new spectrum according to the local spectrum detection and the spectrum detection result returned by each terminal, and broadcasts the new spectrum location of the uplink random access channel through the downlink broadcast channel.

In a cyclic downlink CCSK time slot, the base station transmits a common channel spectrum negotiation message or a common channel configuration message, and the terminal monitors the common channel spectrum negotiation message or the common channel configuration message so as to complete spectrum negotiation or common channel configuration. In a cyclic uplink CCSK time slot, the terminal transmits a spectrum negotiation message or feeds back local spectrum detection result. Different types of messages can be distinguished based on different CCSK sequences.

Herein, the spectrum detection result reported by the terminal through the common channels has the following data structure:

```
MSG_CH_FEEDBACK :=
{
    CH_INFOR item_1; // information of sub-channel 1
    ...
    CH_INFOR item_n; // information of sub-channel n
ID    device_id; // device identification
};
CH_INFOR :=
{
    CH_LOC item; // sub-channel location
    AVG_AVLB_TIME availability; // average continuous available time
    IDLE_PRB   P_i; // idle probability
}.
```

Next, the working flows of a base station and a terminal in the embodiment are exemplary described as follows with reference to FIGS. 6 and 7.

Figure 6:
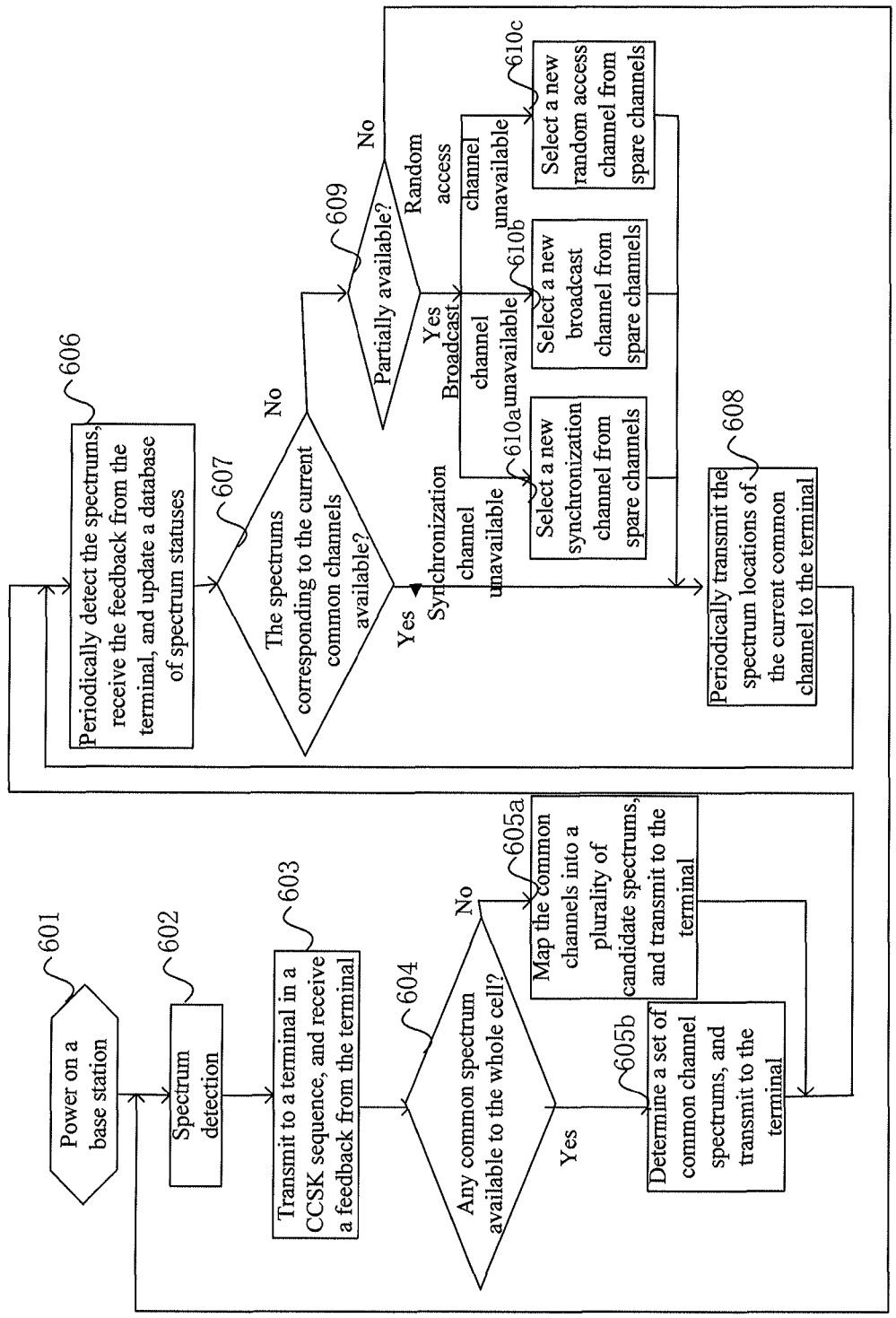
FIG. 6 is a working flowchart for a base station according to Example 3 of the method for common channel processing of the present invention.

FIG. 6 is a working flow of a base station in Example 3 of a method for common channel processing according to the present invention. The working flow of the base station may be hereinafter described with reference to FIG. 6.

In step 601, a base station is powered on.

In step 602, after being powered on, the base station performs spectrum detection to acquire candidate spectrums, i.e., a first set of common channel spectrum candidates.

In step 603, the base station transmits the candidate spectrums to a terminal in a CCSK sequence modulation mode, and receives a third set of common channel spectrum candidates fed back by the terminal.

In step 604, the base station determines whether there is any common candidate spectrum available to the whole cell, from the received third sets of the common channel spectrum candidates fed back by plural terminals. If not, the flow turns to step 605a, and if yes, the flow turns to step 605b.

In step 605a, the base station maps the common channels into a plurality of candidate spectrums to form a set of the common channel spectrums, i.e., determines locations of the synchronization channel, the broadcast channel and the random access channel, and transmits the set of the common channel spectrums to the terminals in the CCSK sequence modulation mode (see step 302 for details).

In step 605b, the base station determines a set of common channel spectrums from the common candidate spectrums, i.e., determines locations of the synchronization channel, the broadcast channel and the random access channel, and transmits the set of the common channel spectrums to the terminal in the CCSK sequence modulation mode.

In step 606, during the communication between the base station and the terminal, the base station periodically detects the spectrums, receives the feedback (CCSK feedback and common channel feedback message) from the terminal, and updates a database of spectrum statuses.

In step 607, the base station judges whether the spectrums corresponding to the current common channel are available. If yes, the flow turns to step 608, otherwise the flow turns to step 609.

In step 608, the base station periodically transmits spectrum locations of the current common channels to the terminal in the CCSK sequence modulation mode.

In step 609, the base station judges again whether the spectrums corresponding to the current common channels are partially available.

If not, i.e., none of the spectrums corresponding to the current common channels is available, the flow returns to step 602, in which the base station resumes spectrum detection to generate a new set of common channel spectrums.

If yes, i.e., the spectrums corresponding to the current common channels are partially unavailable, step 610a is performed when the synchronization channel is unavailable to select a new synchronization channel from the spare channels, step 610b is performed when the broadcast channel is unavailable to select a new broadcast channel from the spare channels, or step 610c is performed when the random access channel is unavailable to select a new random access channel from the spare channels.

After step 610a, 610b or 610c is performed, step 608 is performed to periodically transmit the spectrum locations of the selected new common channel to the terminal in the CCSK sequence modulation mode.

Figure 7:
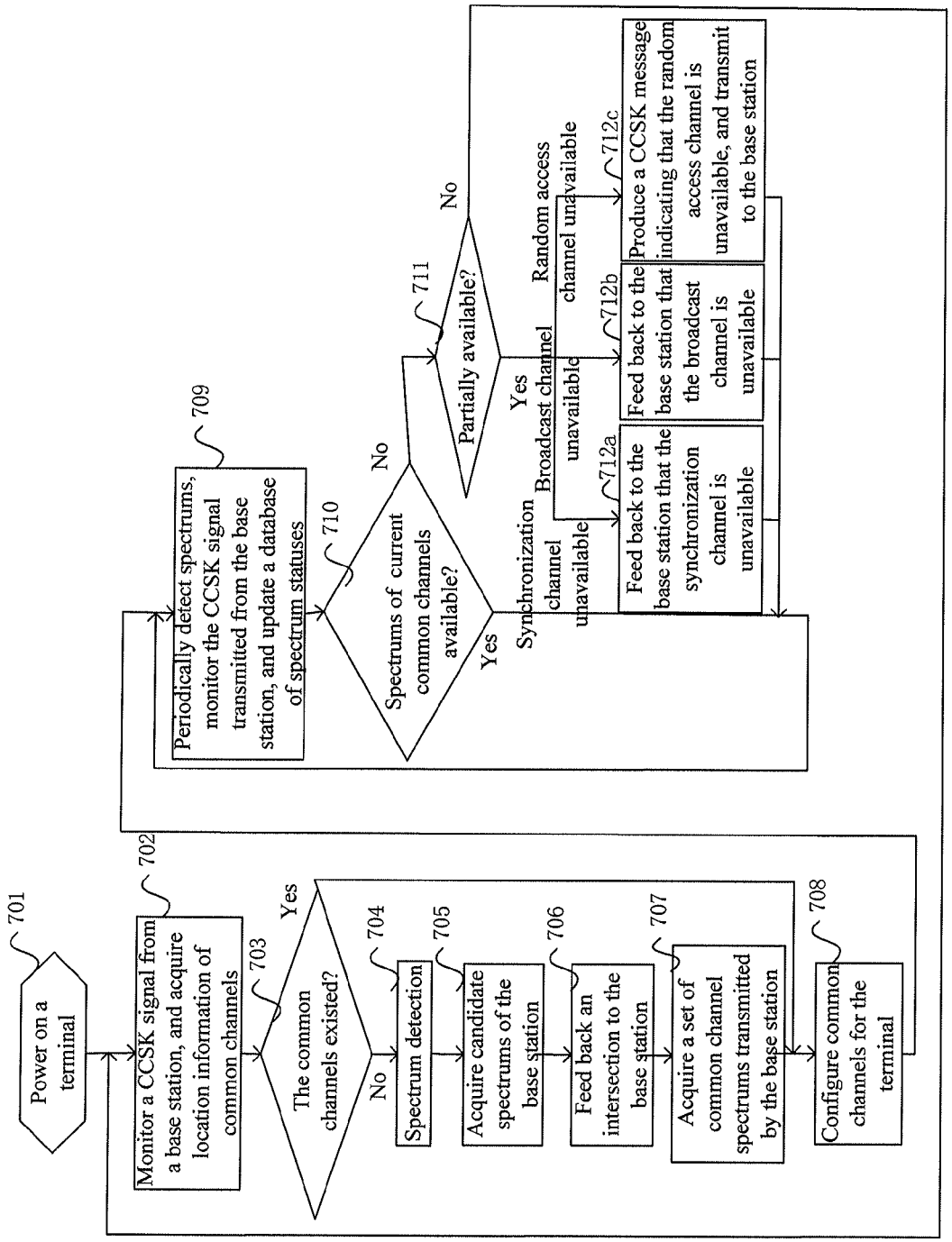
FIG. 7 is a working flowchart for a terminal according to Example 3 of the method for common channel processing of the present invention.

FIG. 7 is a working flow of a terminal in Example 3 of a method for common channel processing according to the present invention. The working flow of the terminal may be hereinafter described with reference to FIG. 7.

In step 701, a terminal is powered on.

In step 702, after being powered on, the terminal monitors a CCSK signal from a base station, and acquires location information of common channels from a CCSK signal corresponding to the terminal, i.e., acquires a set of common channel spectrums.

In step 703, the terminal judges whether the common channels have been existed. If not, the flow turns to step 704, and if yes, the flow turns to step 708.

In step 704, the terminal performs spectrum detection to acquire a second set of the common channel spectrum candidates.

In step 705, the terminal acquires the candidate spectrums of the base station (i.e., a first set of common channel spectrum candidates) from the CCSK signal transmitted by the base station.

In step 706, the terminal determines an intersection of the first and second sets of common channel spectrum candidates, and feeds back the intersection to the base station in a CCSK sequence modulation mode, so that the base station determines a set of common channel spectrums.

In step 707, the terminal acquires the set of the common channel spectrums transmitted by the base station from the CCSK signal transmitted by the base station.

In step 708, the terminal configures common channels thereof according to the common channels or the set of the common channel spectrums.

In step 709, during the communication between the terminal and the base station, the terminal periodically detects the spectrums, receives the CCSK signal transmitted from the base station, and updates a database of spectrum statuses.

In step 710, the terminal judges whether the spectrums of the current common channels are available. If yes, the flow turns to step 709, otherwise turns to step 711.

In step 711, the terminal judges again whether the spectrums corresponding to the current common channels are partially available.

If not, i.e., none of the spectrums corresponding to the current common channels is available, the flow returns to step 702, in which the terminal resumes the steps after being powered on to generate a new set of common channel spectrums.

If yes, i.e., the spectrums corresponding to the current common channels are partially unavailable, step 712a is performed when the synchronization channel is unavailable to feed back to the base station that the synchronization channel is unavailable through a message of the random access channel, step 712b is performed when the broadcast channel is unavailable to feed back to the base station that the broadcast channel is unavailable through a message of the random access channel, or step 712c is performed when the random access channel is unavailable to produce a CCSK message indicating that the random access channel is unavailable and transmit the CCSK message to the base station, so that the base station selects new common channels from spare channels according to the feedback from the terminal, or re-determines common channels.

To be noted, the flows in FIGS. 6-7 are not unique limitations to the base station and the terminal.

It can be seen that the method for common channel processing provided by the embodiments of the present invention can be applied to an NC-OFDM CR system, thereby providing a reliable method for common channel acquisition and maintenance to the NC-OFDM CR cellular system in a dynamic spectrum environment, by means of spectrum detection, spectrum synchronization, common channel assignment and common channel maintenance. The cellular system employing the solution implements backward compatibility of spectrum assignment. That is to say, after common channels are generated and managed with the present solution in the dynamic spectrum assignment environment, legacy systems and standards based on fixed spectrum common channels can all operate in the dynamic spectrum assignment environment. The spectrum sharing between different systems can also be achieved.

A person skilled in the art shall be appreciated that all or a part of steps for implementing the above method embodiments may be completed by instructing relevant hardware through a program that may be stored in a computer readable storage medium, and when being executed, the program performs the steps including the above method embodiments. The storage medium may include various mediums capable of storing program codes, such as a ROM, a RAM, a magnetic disk or an optical disk.

Figure 8:
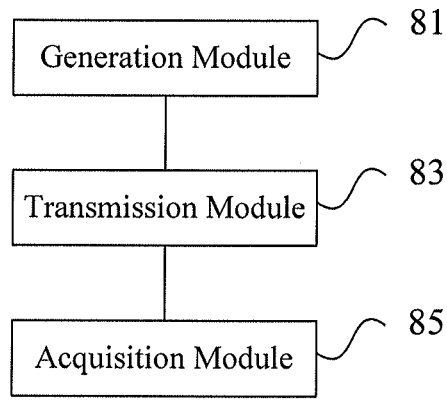
FIG. 8 is a structure diagram of Example 1 of a base station of the present invention.

FIG. 8 is a structure diagram of Example 1 of a base station according to the present invention. As illustrated in FIG. 8, the base station includes a generation module 81, a transmission module 83 and an acquisition module 85.

The generation module 81 is configured to generate a first set of common channel spectrum candidates according to location information of available sub-carriers, and attribute information of the available sub-carriers retrieved from a first database of spectrum statuses.

Herein, the first database of spectrum statuses includes attribute information of all the local sub-carriers of the base station. Herein, the first database of spectrum statuses may be, but not limited to, a database integrated with the base station, or a database external to the base station capable of communicating with the external database.

Herein, the attribute information of the sub-carriers is history information of usage statuses of the sub-carriers, and may include average continuous available time, idle probability, capacity and other statistical information of the respective sub-carriers.

The transmission module 83 is configured to transmit the first set of the common channel spectrum candidates to a terminal, so that the terminal determines a third set of common channel spectrum candidates according to the first set of the common channel spectrum candidates and a second set of the common channel spectrum candidates generated by the terminal.

The third set of the common channel spectrum candidates is an intersection of the first and second sets of the common channel spectrum candidates.

The acquisition module 85 is configured to determine candidate sub-channels for the common channels from the third set of the common channel spectrum candidates returned by the terminal, and generate a set of common channel spectrums. The set of the common channel spectrums includes mapping relationship between the spectrums of the common channels and the candidate sub-channels for the common channel. Each candidate sub-channel has corresponding spectrum information. After the candidate sub-channels for the common channels are determined from the third set of the common channel spectrum candidates, the spectrums of the candidate sub-channels are determined as those of the common channels.

The transmission module 83 is further configured to transmit the set of the common channel spectrums generated by the acquisition module 85 to the terminal.

In the embodiment, the working principle and working flow of each module are the same as those described in Example 1 of the above method, and herein are omitted.

It can be seen that in the embodiment of the present invention, the base station acquires the local available sub-carriers to generate the first set of the common channel spectrum candidates, performs a spectrum negotiation with the second set of the common channel spectrum candidates generated by the terminal, and finally determines the set of the common channel spectrums from the available sub-carriers shared by the base station and the terminal, so that a common channel mechanism is enabled in a dynamic spectrum environment. Therefore, the embodiment of the present invention enables a legacy system to operate in a fixedly assigned or non-fixedly (i.e., dynamically) assigned spectrum environment to implement backward compatibility of spectrum synchronization. Meanwhile, a dynamic spectrum sharing can be achieved between different systems due to opportunity type access to spectrums.

Figure 9:
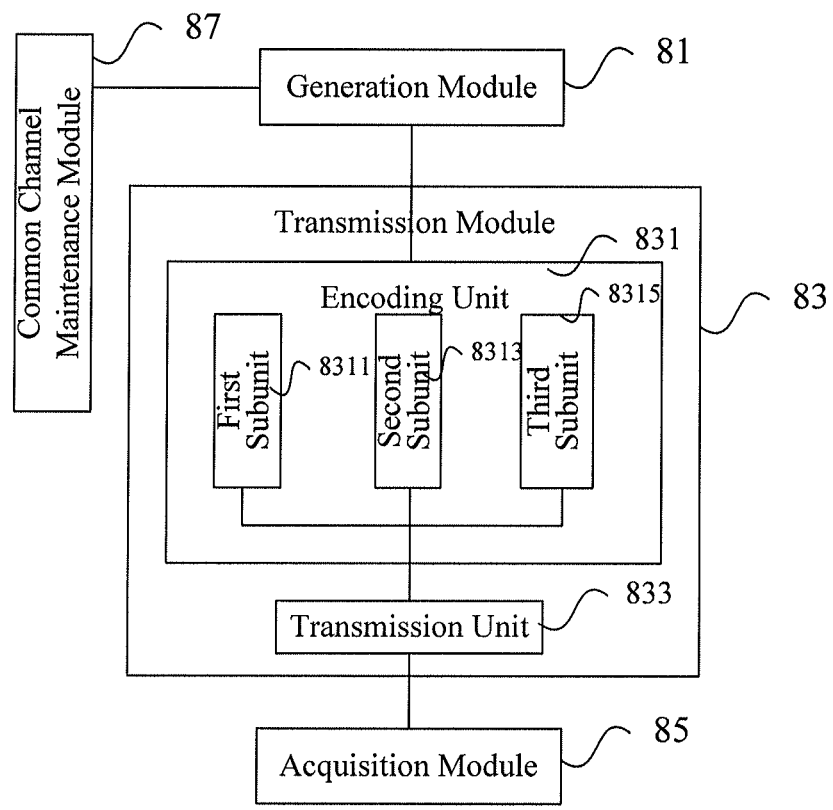
FIG. 9 is a structure diagram of Example 2 of a base station of the present invention.

FIG. 9 is a structure diagram of Example 2 of a base station according to the present invention. As illustrated in FIG. 9, in addition to those included in Example 1 of the base station, the base station further includes a common channel maintenance module 87.

The transmission module 83 includes an encoding unit 831 and a transmission unit 833.

The encoding unit 831 is configured to encode location information of the candidate sub-channels in the first set of the common channel spectrum candidates and the set of the common channel spectrums. The transmission unit 833 is configured to transmit the first set of the common channel spectrum candidates and the set of the common channel spectrums encoded by the encoding unit 831 to the terminal in the CCSK sequence modulation mode. Herein, each set of the common channel spectrum candidates includes location information of the candidate sub-channels.

The encoding unit 831 includes a first subunit 8311, and/or a second subunit 8313, and/or a third subunit 8315.

The first subunit 8311 is configured to encode the location information of the candidate sub-channels by representing the same with sequence numbers of sub-channels of fixed working frequency bands. The second subunit 8313 is configured to encode the location information of the candidate sub-channels by representing the same with locations of the first and the last sub-carriers, or with the first sub-carrier and the number of consecutive sub-carriers. The third subunit 8315 is configured to encode the location information of the candidate sub-channels by representing the same with a spectrum mask.

The common channel maintenance module 87 is configured to periodically trigger the generation module 81, so as to acquire a current set of common channel spectrums and maintain the common channels.

According to one implementation, the acquisition module 85 is configured to determine candidate sub-channels matching types of common channels to be determined from an intersection or a partial intersection of a plurality of the third sets of the common channel spectrum candidates returned by a plurality of terminals as the common channels, according to the attribute information or type information of the candidate sub-channels in the third sets of the common channel spectrum candidates, and the types of the common channels to be determined, and generate a set of common channel spectrums.

Alternatively, according to another implementation, the acquisition module 85 is configured to select candidate sub-channels matching types of common channels to be determined, from an intersection or a partial intersection of a plurality of the third sets of the common channel spectrum candidates returned by a plurality of terminals, according to the attribute information or type information of the candidate sub-channels in the third sets of the common channel spectrum candidates, and the types of the common channels to be determined, and generate a primary set of common channel spectrums and at least one spare set of common channel spectrums according to the selected candidate sub-channels. The spare set of the common channel spectrums includes mapping relationship between the spectrums of the common channels and the spare candidate sub-channels for the common channels. The third set of the common channel spectrum candidates further includes the attribute information of the candidate sub-channels or the type information corresponding to the attribute information.

Herein, the types of the common channels are determined by the functions thereof, and the common channels with different functions have different types. In addition, different types of common channels each have a specific requirement on the attribute of the employed sub-channels.

In the embodiment, the working principle and working flow of each module and unit are the same as those described in various examples of the above method, and herein are omitted.

It can be seen that in the embodiment of the present invention, the base station acquires the local available sub-carriers to generate the first set of the common channel spectrum candidates, performs a spectrum negotiation with the second set of the common channel spectrum candidates generated by the terminal in the CCSK sequence modulation mode, and finally determines the set of the common channel spectrums from the available sub-carriers shared by the base station and the terminal, so that a common channel mechanism is enabled in a dynamic spectrum environment. Therefore, the embodiment of the present invention enables a legacy system to operate in a fixedly assigned or non-fixedly (i.e., dynamically) assigned spectrum environment to implement backward compatibility of spectrum synchronization. Meanwhile, a dynamic spectrum sharing can be achieved between different systems due to opportunity type access to spectrums.

Figure 10:
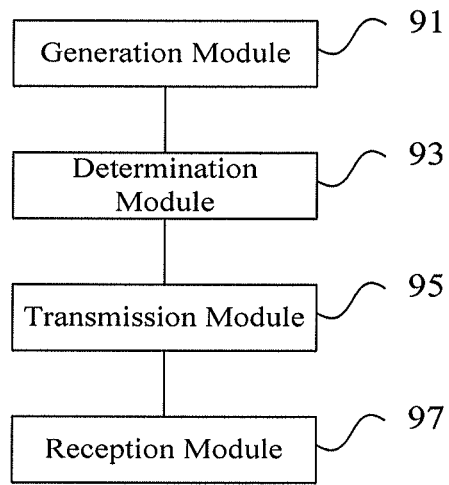
FIG. 10 is a structure diagram of Example 1 of a terminal of the present invention.

FIG. 10 is a structure diagram of Example 1 of a terminal according to the present invention. As illustrated in FIG. 10, the terminal includes a generation module 91, a determination module 93, a transmission module 95 and a reception module 97.

The generation module 91 is configured to generate a second set of common channel spectrum candidates according to location information of available sub-carriers, and attribute information of the available sub-carriers retrieved from a second database of spectrum statuses.

Herein, the second database of spectrum statuses includes attribute information of all the local available sub-carriers of the terminal. Herein, the second database of spectrum statuses may be, but not limited to, a database integrated with a terminal, or a database external to a terminal capable of communicating with the external database.

Herein, the attribute information of the sub-carriers is history information of usage statuses of the sub-carriers, and may include average continuous available time, idle probability, capacity and other statistical information of the respective sub-carriers.

The determination module 93 is configured to determine a third set of the common channel spectrum candidates, according to the second set of the common channel spectrum candidates and a first set of common channel spectrum candidates received from and generated by a base station. The third set of the common channel spectrum candidates is an intersection of the first and second sets of the common channel spectrum candidates.

The transmission module 95 is configured to transmit the third set of the common channel spectrum candidates to the base station.

The reception module 97 is configured to receive a set of common channel spectrums returned by the base station. The set of the common channel spectrums includes mapping relationship between the spectrums of the common channels and the candidate sub-channels determined for the common channels in the third set of the common channel spectrum candidates.

In the embodiment, the working principle and working flow of each module are the same as those described in Example 2 of the above method, and herein are omitted.

It can be seen that in the embodiment of the present invention, the terminal acquires the local available sub-carriers to generate the second set of the common channel spectrum candidates, and performs a spectrum negotiation with the first set of the common channel spectrum candidates generated by the base station. Finally the base station determines the set of the common channel spectrums from the available sub-carriers shared by the base station and the terminal. Thus, a common channel mechanism is enabled in a dynamic spectrum environment.

Figure 11:
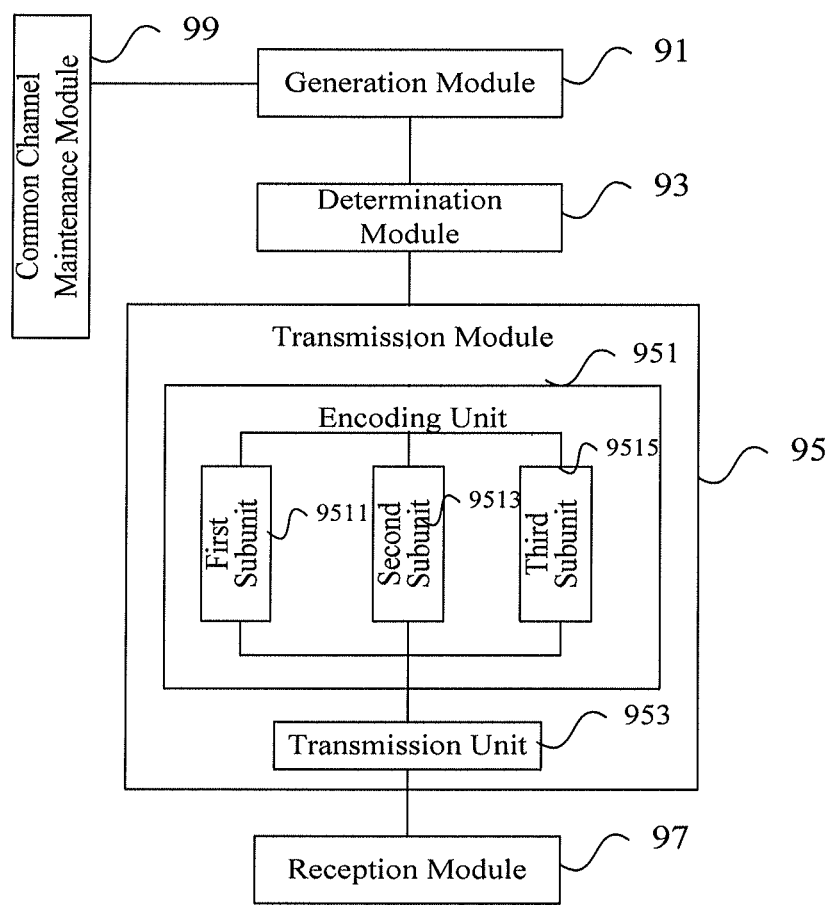
FIG. 11 is a structure diagram of Example 2 of a terminal of the present invention.

FIG. 11 is a structure diagram of Example 2 of a terminal according to the present invention. As illustrated in FIG. 11, in addition to those included in Example 1 of the terminal, the terminal further includes a common channel maintenance module 99.

The transmission module 95 includes an encoding unit 951 and a transmission unit 953.

The encoding unit 951 is configured to encode location information of the candidate sub-channels in the third set of the common channel spectrum candidates. Herein, each set of the common channel spectrum candidates may include the location information of the candidate sub-channels.

The transmission unit 953 is configured to transmit the third set of the common channel spectrum candidates encoded by the encoding unit 951 to the base station in the CCSK sequence modulation mode.

The encoding unit 951 may include a first subunit 9511, and/or a second subunit 9513, and/or a third subunit 9515.

The first subunit 9511 is configured to encode the location information of the candidate sub-channels by representing the same with sequence numbers of sub-channels of fixed working frequency bands. The second subunit 9513 is configured to encode the location information of the candidate sub-channels by representing the same with locations of the first and the last sub-carriers, or with the first sub-carrier and the number of consecutive sub-carriers. The third subunit 9515 is configured to encode the location information of the candidate sub-channels by representing the same with a spectrum mask.

The common channel maintenance module 99 is configured to periodically trigger the generation module 91, so as to determine a current third set of common channel spectrum candidates, and transmit the determined current third set of the common channel spectrum candidates to the base station.

The reception module 97 is configured to receive a set of common channel spectrums returned by the base station, or a primary set of common channel spectrums and at least one spare set of common channel spectrums returned by the base station. The spare set of the common channel spectrums includes mapping relationship between the spectrums of the common channels and spare candidate sub-channels for the common channels in the third set of the common channel spectrum candidates.

In the embodiment, the working principle and working flow of each module and unit are the same as those described in various examples of the above method, and herein are omitted.

It can be seen that in the embodiment of the present invention, the terminal acquires the local available sub-carriers to generate the second set of the common channel spectrum candidates, and performs a spectrum negotiation with the first set of the common channel spectrum candidates generated by the base station in the CCSK sequence modulation mode. Finally the base station determines the set of the common channel spectrums from the available sub-carriers shared by the base station and the terminal, so that a common channel mechanism is enabled in a dynamic spectrum environment.

An embodiment of the present invention further provides a system for common channel processing, including a base station and a terminal.

The base station is configured to generate a first set of common channel spectrum candidates according to location information of available sub-carriers and attribute information of the available sub-carriers retrieved from a first database of spectrum statuses; transmit the first set of the common channel spectrum candidates to the terminal, and determine candidate sub-channels for common channels from a third set of common channel spectrum candidates returned by the terminal to generate a set of common channel spectrums; and transmit the generated set of the common channel spectrums to the terminal. Herein, the third set of the common channel spectrum candidates is an intersection of the first and second sets of the common channel spectrum candidates, and the set of the common channel spectrums includes mapping relationship between the spectrums of the common channels and the candidate sub-channels for the common channels.

The terminal is configured to generate a second set of common channel spectrum candidates according to location information of available sub-carriers, and attribute information of the available sub-carriers retrieved from a second database of spectrum statuses; determine a third set of common channel spectrum candidates, according to the second set of the common channel spectrum candidates and a first set of common channel spectrum candidates received from and generated by the base station; transmit the third set of the common channel spectrum candidates to the base station; and receive a set of common channel spectrums returned by the base station. Herein, the third set of the common channel spectrum candidates is an intersection of the first and second sets of the common channel spectrum candidates; and the set of the common channel spectrums includes mapping relationship between the spectrums of the common channels and the candidate sub-channels determined for the common channels in the third set of the common channel spectrum candidates.

In the embodiment, the working principles and working flows of the base station and the terminal are the same as those described in various examples of the above method and device, and herein are omitted.

The embodiment of the present invention can be applied to an NC-OFDM CR system, thereby providing a reliable method for common channel acquisition and maintenance to the NC-OFDM CR cellular system in a dynamic spectrum environment, by spectrum detection, spectrum synchronization, common channel assignment and common channel maintenance. The cellular system employing the solution implements backward compatibility of spectrum assignment. That is to say, after common channels are generated and managed with the present solution in a dynamic spectrum assignment environment, legacy systems and standards based on fixed spectrum common channels can all operate in the dynamic spectrum assignment environment. The spectrum sharing between different systems can also be achieved.

Finally to be noted, the above embodiments are just used to describe the technical solutions of the present invention rather than making limitations thereto. Although the present invention is detailedly described with reference to the above embodiments, a person skilled in the art shall be appreciated that the technical solutions recorded in the above embodiments still can be changed, or some technical features thereof can be equivalently replaced, without making the essences of corresponding technical solutions deviate from the spirit and range of the technical solutions of respective embodiments of the present invention.

What is claimed is:

1. A method for common channel processing, comprising:
generating a first set of common channel spectrum candidates according to location information of available sub-carriers and attribute information of the available sub-carriers retrieved from a first database of spectrum statuses;
transmitting the first set of the common channel spectrum candidates to a terminal, so that the terminal determines a third set of common channel spectrum candidates according to the first set of the common channel spectrum candidates and a second set of common channel spectrum candidates generated by the terminal, wherein the third set of the common channel spectrum candidates is an intersection of the first set of the common channel spectrum candidates and the second set of the common channel spectrum candidates; and
determining candidate sub-channels for common channels from the third set of the common channel spectrum candidates returned by the terminal, so as to generate and transmit a set of common channel spectrums to the terminal, wherein the set of the common channel spectrums comprises mapping relationship between the common channels and the spectrums of the candidate sub-channels for the common channels,
wherein each set of the common channel spectrum candidates comprises location information of the candidate sub-channels,
wherein the transmitting the first set of the common channel spectrum candidates to the terminal comprises:
encoding the location information of the candidate sub-channels in the first set of the common channel spectrum candidates; and
transmitting the encoded first set of the common channel spectrum candidates to the terminal in a Cyclic Code Shift Keying sequence modulation mode.

2. The method for common channel processing according to claim 1, wherein the encoding the location information of the candidate sub-channels in the first set of the common channel spectrum candidates comprises:
encoding the location information of the candidate sub-channels by representing the location information of the candidate sub-channels with sequence numbers of sub-channels of fixed working frequency bands.

3. The method for common channel processing according to claim 1, wherein the encoding the location information of the candidate sub-channels in the first set of the common channel spectrum candidates comprises:
encoding the location information of the candidate sub-channels by representing the location information of the candidate sub-channels with the locations of the first and the last sub-carriers, or with the first sub-carrier and the number of consecutive sub-carriers.

4. The method for common channel processing according to claim 1, wherein the encoding the location information of the candidate sub-channels in the first set of the common channel spectrum candidates comprises:
encoding the location information of the candidate sub-channels by representing the location information of the candidate sub-channels with a spectrum mask.

5. The method for common channel processing according to claim 1, wherein after transmitting the set of the common channel spectrums to the terminal, the method further comprises:
periodically acquiring a current set of common channel spectrums to update a database of spectrum statuses of the common channels.

6. The method for common channel processing according to claim 1, wherein the third set of the common channel spectrum candidates further comprises: attribute information of the candidate sub-channels, or type information corresponding to the attribute information; and the determining the candidate sub-channels for the common channels from the third set of the common channel spectrum candidates returned by the terminal comprises:
determining candidate sub-channels matching the types of common channels to be determined from an intersection or a partial intersection of a plurality of the third sets of the common channel spectrum candidates as the common channels according to the attribute information or the type information of the candidate sub-channels in the third sets of the common channel spectrum candidates, and the types of the common channels to be determined, and then generating the set of the common channel spectrums.

7. The method for common channel processing according to claim 1, wherein the third set of the common channel spectrum candidates further comprises: attribute information of the candidate sub-channels, or type information corresponding to the attribute information; and the determining the candidate sub-channels for the common channels from the third set of the common channel spectrum candidates returned by the terminal comprises:
- selecting candidate sub-channels matching the types of common channels to be determined, from an intersection or a partial intersection of a plurality of the third sets of the common channel spectrum candidates, according to the attribute information or the type information of the candidate sub-channels in the third sets of the common channel spectrum candidates, and the types of the common channels to be determined, and then generating a primary set of common channel spectrums and at least one spare set of common channel spectrums according to the selected candidate sub-channels.

8. A method for common channel processing, comprising:
- generating a second set of common channel spectrum candidates according to location information of available sub-carriers, and attribute information of the available sub-carriers retrieved from a second database of spectrum statuses;
- determining a third set of common channel spectrum candidates, according to the second set of the common channel spectrum candidates and a first set of common channel spectrum candidates received from and generated by a base station, and transmitting the third set of the common channel spectrum candidate to the base station; wherein the third set of the common channel spectrum candidates is an intersection of the first set of the common channel spectrum candidates and the second set of the common channel spectrum candidates; and
- receiving a set of common channel spectrums returned by the base station, wherein the set of the common channel spectrums comprises mapping relationship between the common channels and the spectrums of candidate sub-channels determined for the common channels in the third set of the common channel spectrum candidates,
- wherein each set of the common channel spectrum candidates comprises location information of the candidate sub-channels,
- wherein the transmitting the third set of the common channel spectrum candidates to the base station comprises:
- encoding the location information of the candidate sub-channels in the third set of the common channel spectrum candidates; and
- transmitting the encoded third set of the common channel spectrum candidates to the base station in a Cyclic Code Shift Keying sequence modulation mode.

9. The method for common channel processing according to claim 8, wherein the encoding the location information of the candidate sub-channels in the third set of the common channel spectrum candidates comprises:
- encoding the location information of the candidate sub-channels by representing the location information of the candidate sub-channels with sequence numbers of sub-channels of fixed working frequency bands.

10. The method for common channel processing according to claim 8, wherein the encoding the location information of the candidate sub-channels in the third set of the common channel spectrum candidates comprises:
- encoding the location information of the candidate sub-channels by representing the location information of the candidate sub-channels with the locations of the first and last sub-carriers, or with the first sub-carrier and the number of consecutive sub-carriers.

11. The method for common channel processing according to claim 8, wherein the encoding the location information of the candidate sub-channels in the third set of the common channel spectrum candidates comprises:
- encoding the location information of the candidate sub-channels by representing the location information of the candidate sub-channels with a spectrum mask.

12. The method for common channel processing according to claim 8, further comprising:
- periodically determining a current third set of common channel spectrum candidates, and transmitting the determined current third set of the common channel spectrum candidates to the base station.

13. The method for common channel processing according to claim 9, wherein the receiving the set of the common channel spectrums returned by the base station comprises:
- receiving a set of common channel spectrums returned by the base station, or a primary set of common channel spectrums and at least one spare set of common channel spectrums returned by the base station.

14. A base station, comprising:
- a generation module configured to generate a first set of common channel spectrum candidates according to location information of available sub-carriers, and attribute information of the available sub-carriers retrieved from a first database of spectrum statuses;
- a transmission module configured to transmit the first set of the common channel spectrum candidates to a terminal, so that the terminal determines a third set of common channel spectrum candidates according to the first set of the common channel spectrum candidates and a second set of common channel spectrum candidates generated by the terminal, wherein the third set of the common channel spectrum candidates is an intersection of the first set of the common channel spectrum candidates and the second set of the common channel spectrum candidates; and
- an acquisition module configured to determine candidate sub-channels for common channels from the third set of the common channel spectrum candidates returned by the terminal, and generate a set of common channel spectrums, wherein the set of the common channel spectrums comprises mapping relationship between the common channels and the spectrums of the candidate sub-channels for the common channel; and
- wherein the transmission module is further configured to transmit the set of the common channel spectrums generated by the acquisition module to the terminal, and
- wherein each set of the common channel spectrum candidates comprises location information of the candidate sub-channels,
- wherein the transmission module comprises:
- an encoding unit configured to encode the location information of the candidate sub-channels in the first set of the common channel spectrum candidates and the set of the common channel spectrums; and
- a transmission unit configured to transmit the first set of the common channel spectrum candidates and the set of the common channel spectrums encoded by the encoding unit to the terminal in a Cyclic Code Shift Keying sequence modulation mode.

15. The base station according to claim 14, wherein the encoding unit comprises:
- a first subunit configured to encode the location information of the candidate sub-channels by representing the location information of the candidate sub-channels with sequence numbers of sub-channels of fixed working frequency bands.

16. The base station according to claim 14, wherein the encoding unit comprises:
- a second subunit configured to encode the location information of the candidate sub-channels by representing the location information of the candidate sub-channels with the locations of the first and last sub-carriers, or with the first sub-carrier and the number of consecutive sub-carriers.

17. The base station according to claim 14, wherein the encoding unit comprises:
- a third subunit configured to encode the location information of the candidate sub-channels by representing the location information of the candidate sub-channels with a spectrum mask.

18. The base station according to claim 14, further comprising:
- a common channel maintenance module configured to periodically trigger the generation module so as to acquire a current set of common channel spectrums and update a database of spectrum statuses of the common channels.

19. The base station according to claim 14, wherein the third set of the common channel spectrum candidates further comprises: attribute information of the candidate sub-channels, or type information corresponding to the attribute information;
- and wherein the acquisition module is further configured to determine candidate sub-channels matching the types of common channels to be determined from an intersection or a partial intersection of a plurality of the third sets of the common channel spectrum candidates as the common channels, according to the attribute information or the type information of the candidate sub-channels in the third sets of the common channel spectrum candidates, and the types of the common channels to be determined, and then generate a set of common channel spectrums.

20. The base station according to claim 14, wherein the third set of the common channel spectrum candidates further comprises: attribute information of the candidate sub-channels, or type information corresponding to the attribute information;
- the acquisition module is further configured to select candidate sub-channels matching the types of common channels to be determined, from an intersection or a partial intersection of a plurality of the third sets of the common channel spectrum candidates, according to the attribute information or the type information of the candidate sub-channels in the third sets of the common channel spectrum candidates, and the types of the common channels to be determined, and then generate a primary set of common channel spectrums and at least one spare set of common channel spectrums according to the selected candidate sub-channels.

21. A terminal, comprising:
- a generation module configured to generate a second set of common channel spectrum candidates according to location information of available sub-carriers, and attribute information of the available sub-carriers retrieved from a second database of spectrum statuses;
- a determination module configured to determine a third set of common channel spectrum candidates, according to the second set of the common channel spectrum candidates and a first set of common channel spectrum candidates received from and generated by a base station, wherein the third set of the common channel spectrum candidates is an intersection of the first set of the common channel spectrum candidates and the second set of the common channel spectrum candidates;
- a transmission module configured to transmit the third set of the common channel spectrum candidates to the base station; and
- a reception module configured to receive a set of common channel spectrums returned by the base station, wherein the set of the common channel spectrums comprises mapping relationship between the common channels and the spectrums of the candidate sub-channels determined for the common channels in the third set of the common channel spectrums,
- wherein each set of the common channel spectrum candidates comprises location information of the candidate sub-channels,
- wherein the transmission module comprises:
- an encoding unit configured to encode the location information of the candidate sub-channels in the third set of the common channel spectrum candidates; and
- a transmission unit configured to transmit the third set of the common channel spectrum candidates encoded by the encoding unit to the base station in a Cyclic Code Shift Keying sequence modulation mode.

22. The terminal according to claim 21, wherein the encoding unit comprises:
- a first subunit configured to encode the location information of the candidate sub-channels by representing the location information of the candidate sub-channels with sequence numbers of sub-channels of fixed working frequency bands.

23. The terminal according to claim 21, wherein the encoding unit comprises:
- a second subunit configured to encode the location information of the candidate sub-channels by representing the location information of the candidate sub-channels with the locations of the first and the last sub-carriers, or with the first sub-carrier and the number of consecutive sub-carriers.

24. The terminal according to claim 21, wherein the encoding unit comprises:
- a third subunit configured to encode the location information of the candidate sub-channels by representing the location information of the candidate sub-channels with a spectrum mask.

25. The terminal according to claim 21, further comprising:
- a common channel maintenance module configured to periodically trigger the generation module so as to determine a current third set of common channel spectrum candidates, and transmit the determined current third set of the common channel spectrum candidates to the base station.

26. The terminal according to claim 21, wherein the reception module is further configured to receive a set of common channel spectrums returned by the base station.

* * * * *